United States Patent [19]
LaValley

[11] Patent Number: 4,697,292
[45] Date of Patent: * Oct. 6, 1987

[54] SHOWER PIPES FOR ROTARY DRUM FILTER

[75] Inventor: Richard W. LaValley, Vancouver, Wash.

[73] Assignee: LaValley Industrial Plastics, Inc., Vancouver, Wash.

[*] Notice: The portion of the term of this patent subsequent to Jun. 11, 2002 has been disclaimed.

[21] Appl. No.: 756,769

[22] Filed: Jul. 18, 1985

Related U.S. Application Data

[60] Continuation-in-part of Ser. No. 703,033, Feb. 19, 1985, Pat. No. 4,670,099, which is a division of Ser. No. 464,023, Feb. 4, 1983, Pat. No. 4,522,716, and a continuation-in-part of Ser. No. 709,450, Mar. 8, 1985, which is a continuation-in-part of Ser. No. 464,023, Feb. 4, 1983, Pat. No. 4,522,716.

[51] Int. Cl.$^4$ .............................................. D06B 1/02
[52] U.S. Cl. ........................................ 8/156; 210/217; 210/402; 210/409; 239/523; 239/556; 138/172
[58] Field of Search ............... 210/784, 210, 211, 213, 210/217, 326, 394, 402, 403, 404, 409, 411, 412; 239/521, 523, 548, 556; 138/172, 174, 119, 157, DIG. 2, 174; 162/48, 60, 69, 199; 68/175, 200, 202, 204, 205 R, 903; 8/156

[56] References Cited

U.S. PATENT DOCUMENTS

| | | | |
|---|---|---|---|
| 2,826,248 | 3/1958 | Angel | 239/556 |
| 3,080,124 | 3/1963 | Rathmann | 239/523 |
| 3,099,696 | 7/1963 | Meek | 239/521 |
| 3,150,082 | 9/1964 | Rich | 210/395 |
| 3,363,774 | 1/1968 | Luthi | 210/404 |
| 4,217,935 | 8/1980 | Grendelman et al. | 138/174 |
| 4,248,716 | 2/1981 | LaValley | 210/402 |
| 4,276,169 | 6/1981 | Browne et al. | 210/404 |
| 4,522,716 | 6/1985 | LaValley | 210/210 |

Primary Examiner—Richard V. Fisher
Assistant Examiner—Wanda L. Millard
Attorney, Agent, or Firm—Marger & Johnson

[57] ABSTRACT

A shower pipe for a rotary drum filter includes a fiberglass pipe body of rectangular cross section with two rows of spray holes and with the holes of one row being staggered with respect to the holes of the other row. The upper row includes a separate diffusion flange for each hole. The lower row includes a continuous diffusion flange which is reinforced and rigid to resist deflection and serve as a striker to limit the thickness of pulp stock passing upwardly by the flange. The lower flange includes a flexible flange extension which extends to the pulp mat on the drum to limit heat loss from the spray of washer fluid. Different diffusion flanges on the same pipe define different spray trajectories to prevent overconcentration of spray impinging the mat.

33 Claims, 5 Drawing Figures

SHOWER PIPES FOR ROTARY DRUM FILTER

RELATED APPLICATIONS

This application is a continuation-in-part of application Ser. No. 703,033, filed Feb. 19, 1985, which is now U.S. Pat. No. 4,670,099 which is a division of Ser. No. 464,023 filed Feb. 4, 1983 which is now U.S. Pat. No. 4,522,716 issued June 11, 1985. This application is also a continuation-in-part of application Ser. No. 709,450, filed Mar. 8, 1985, which is also a continuation-in-part of Ser. No. 464,023 filed Feb. 4, 1983 which is now U.S. Pat. No. 4,522,716.

BACKGROUND OF THE INVENTION

The present invention relates generally to rotary drum filters used in the pulp and papermaking industry for forming a mat of pulp fibers from a pulp slurry and for extracting liquid from the mat. More particularly, the present invention relates to shower pipes used in conjunction with such filters for washing chemicals from the mat after it is formed on the drum. More specifically, the invention relates to the liquid diffusion flanges of such shower pipes.

Rotary drum filters are well known and are commonly used, for example, in the pulp- and paper-making industry for separating wood pulp from pulp slurry. Such filters include a rotary drum partially submerged in a tank of pulp slurry. The drum surface is conventionally covered by a filter screen. As the screen rotates through the pulp slurry, a vacuum is applied within a portion of the drum, collecting a wet mat of fibers from the slurry on the screen. As the screen emerges from the tank, slurry liquid or filtrate is drawn inwardly through the screen by the vacuum and discharged through suitable piping, thereby removing the liquid from the mat. Examples of such filters are disclosed generally in U.S. Pat. No. 4,276,169 to Browne, et al., U.S. Pat. No. 4,248,716 to LaValley, U.S. Pat. No. 4,370,231 to LaValley, and in the patents cited therein.

Conventionally, about half a dozen parallel shower pipes are angularly spaced around a segment of the drum extending from just above the surface of the slurry to the top of the drum, proceeding in the direction of drum rotation. These pipes extend axially of the drum and are supported adjacent the ends of the drum. Washing liquid is discharged in a spray from the shower pipes to wash the pulp fibers as the mat emerges from the slurry. The pipes are spaced a fixed radial distance from the filter screen. This distance is preferably constant along the lengths of the pipes so that spray intensity and distribution are substantially uniform all the way across the mat. Examples of such shower pipes are disclosed in U.S. Pat. Nos. 3,150,082 to Rich, 3,363,774 to Luthi, and 4,522,716 to LaValley.

In applicant's aforementioned prior U.S. Pat. No. 4,522,716 and copending application Ser. Nos. 703,033, and 709,450, there are disclosed improved shower pipe designs and methods for their manufacture which are directed to solving the problems of shower pipe corrosion and sag, and of providing complete spray coverage without overconcentration to an extent such that the spray tears the mat. The shower pipe improvements of such prior patent and applications are, for the most part, incorporated in the shower pipes of the present invention, and therefore the disclosures of such prior patent and applications are incorporated herein by reference.

One problem which the shower pipes of the aforementioned patent and applications do not address is the problem of heat loss from the washing liquid from the time of its emission from the shower pipes until it impinges the mat on the drum surface. It is important that the washing liquid be within a certain high-temperature range when it contacts the mat. Accordingly, the amount of heat loss from the spray liquid as it travels between the pipes and the mat determines to what temperature the liquid must be heated as it leaves the pipes. This, in turn, determines how much energy must be expended in maintaining the required temperature of the liquid.

Typically, shower pipes are spaced a radial distance of at least several inches from the surface of the filter drum, and the diffusion flanges of such pipes also terminate a substantial distance from such surface. Consequently, a substantial heat loss from the liquid occurs in traveling from the pipes to the drum. Therefore, substantial amounts of energy and therefore money, are expended in heating the washing liquid to a temperature that will compensate for such heat loss.

A second problem which the shower pipes of applicant's aforementioned prior patent and applications does not address is that of mat "roll-up" on the drum, or excessive mat thickness. During formation of the pulp mat on the drum surface in the upper reaches of the vat of pulp slurry as vacuum is applied to such surface, the mat often rolls back on itself into a roll or slug of stock of excessive thickness. This so-called "roll-up" sometimes emerges from the vat, carried on the upwardly rotating drum surface. If this occurs with a roll-up of sufficient diameter, the roll-up becomes wedged between the drum and the lowermost shower pipe of the bank of such pipes arranged along the emerging side of the drum surface, sometimes permanently deforming or even breaking the pipe or its diffusion flanges to necessitate their replacement, interfering with desired spray diffusion patterns, and interrupting proper mat formation.

A third problem not addressed by the shower pipes of applicant's aforementioned prior patent and applications is that of achieving the desired spray diffusion pattern which does not overconcentrate the spray at any given position on the mat and yet provides complete spray coverage with a shower pipe having only a single row of spray holes arranged axially of the pipe. Heretofore it has been necessary to provide a shower pipe with at least two circumstantially spaced rows of spray holes with the holes of one row being staggered with respect to the holes of the adjacent row to achieve the desired spray pattern. If the same spray diffusion pattern can be provided with a single row of holes, shower pipe manufacturing costs can be reduced.

Accordingly, there is a need for a shower pipe which has all of the attributes of the shower pipes of applicant's aforementioned prior patent and applications, and yet which alleviates the aforementioned problems associated with known shower pipe designs.

Objectives of the present invention, therefore, are to provide a shower pipe having the attributes of the shower pipes described in the aforementioned U.S. Pat. No. 4,522,716 and application Ser. Nos. 703,033 and 709,450, and in addition, features which:

1. inhibit heat loss from the washing liquid as it travels between the shower pipes and the mat;

2. prevent or inhibit pulp stock roll-up or other excessive stock thickness on the surface of the filter drum beyond the lowermost shower pipe;

3. prevent or inhibit shower pipe damage caused by roll-up; and 4. provide a desired spray diffusion pattern from a shower pipe having only a single row of spray holes.

SUMMARY OF THE INVENTION

The foregoing objectives are carried out through the provision of a shower pipe having one or more of the following features, alone or in combination with one another or with features of the shower pipes of U.S. Pat. No. 4,522,716 or applications Ser. Nos. 703,033, and 709,450:

1. A spray diffusion flange extension extends from at least the lowermost diffusion flange means of a shower pipe to a position in close proximity to or in contact with the pulp stock on the drum surface. The extension is preferably flexible to accommodate a pulp mat of varying thickness. The extension is preferably continuous in a direction lengthwise of the associated pipe. The extension may include dam means to confine liquid flow between the opposite side edges of the extension. The extension may be applied to either separate or continuous diffusion flanges. The extension may also be connected to the underside of a diffusion flange using a substantially rigid backing plate or other clamping means which also serves to reinforce the connected flange means to resist roll-up. The extension is preferably applied to the lowermost continuous diffusion flange of a fiberglass shower pipe of rectangular cross section having two rows of staggered spray holes and separate diffusion flanges adjacent each sprayhole of the uppermost row.

2. At least the lowermost diffusion flange means of the lowermost shower pipe in a bank of shower pipes arranged along the upwardly traveling surface of a filter drum is reinforced and configured to provide sufficent rigidity to resist roll-up and serve as a striker means to limit the thickness of pulp stock passing upwardly on the drum surface so as not to interfere with higher-up diffusion flanges in the bank. The reinforcement may be achieved by providing the lowermost flange means with a greater thickness and thus greater rigidity than the other flange means. The striker function may be achieved by providing the lowermost flange means with a greater projecting length than the other flange means or by otherwise positioning the outer end terminus of the lowermost flange means closer to the drum surface than the outer ends of other flange means in the bank.

3. The shower pipe may be provided with a single row of axially spaced apart spray holes, each hole with its own separate spray diffusion flange. The adjacent diffusion flanges project from the pipe at different angles but in the same general directon toward the drum surface so that adjacent flanges define different spray trajectories in diffusing a sheet of spray toward the drum. Every other flange in the row of flanges may project at the same angle from the pipe so that the flanges in a row direct the spray from the single row of spray holes in two different trajectories toward the drum surface. The adjacent flanges may also diffuse the sprays from adjacent holes axially of the pipe so that such sprays overlap axially without merging, thereby providing complete spray coverage of the drum surface without overconcentraton of spray against the mat on such surface.

The foregoing and other objects, features and advantages of the invention will become more apparent from the following detailed description which proceeds with reference to the accompanying drawings.

DESCRIPTION OF PREFERRED EMBODIMENTS

Figure 1:
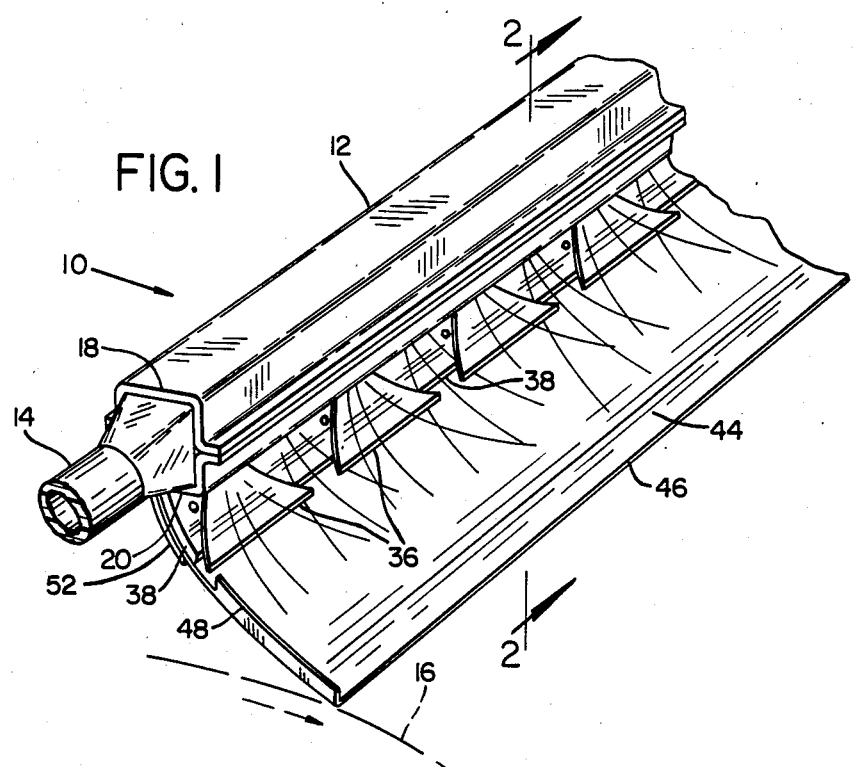
FIG. 1 is a perspective view of one embodiment of shower pipe in accordance with the invention.
Figure 2:
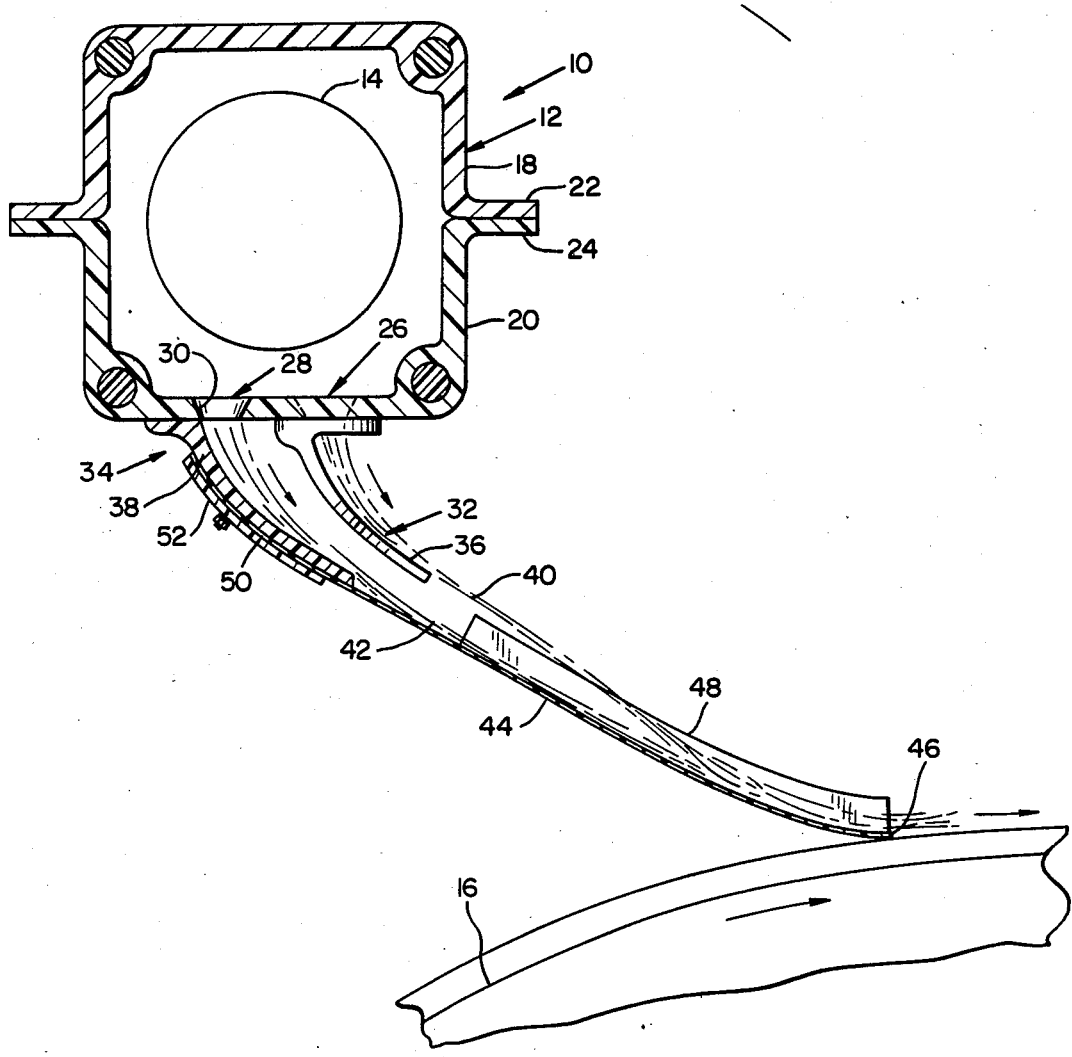
FIG. 2 is a elevational view of the shower pipe of FIG. 1 in operative position adjacent to a drum filter.

Embodiment of FIGS. 1-2

Referring to FIGS. 1 and 2, a shower pipe 10 comprises an elongated conduit or pipe body 12 of rectangular cross section. The body terminates at its opposite ends in square-to-round reducer pipes 14 for support adjacent the opposite ends of a rotary drum filter having a cylindrical filter surface 16. Pipe body 12 is formed of two identical channel-shaped half sections 18, 20 of fiberglass reinforced plastic (FRP) bonded together at mating side flanges 22, 24. The method of manufacturing the body is described in greater detail in U.S. Pat. No. 4,522,716, and such description is incorporated herein reference.

The bottom wall or quadrant of the pipe body includes means for spraying a washing liquid under pressure onto a mat of pulp stock carried by drum surface 16. Spraying occurs as such surface moves upwardly from a vat of pulp slurry and a suction is applied to the drum surface to draw the liquid through the fiber mat into the interior of the drum in a manner well-known in the industry.

In the described embodiment, the spray means includes two parallel, circumferentially spaced apart rows 26, 28 of spray holes 30 extending axially in equally spaced apart relationship along the length of the pipe body. Such length is substantially coextensive with the axial length of the associated filter surface 16. The spray holes, in cross section, have an internally countersunk configuration which is described in more detail in the aforementioned U.S. Pat. No. 4,522,716. Such configuration produces a desired spray configuration as liquid is emitted from the pipe through such holes under pressure. Preferably, the spray holes in one row are axially staggered midway between the spray holes in the other row. The spray holes in each row are also axially spaced apart a sufficient distance such that the sprays from adjacent holes in a row do not overlap axially of the pipe. However, the axial spacing between the staggered holes in the two rows is such that the sprays from adjacent staggered holes do overlap somewhat axially of the pipe before impinging the mat on the drum surface. This spacing feature ensures complete spray coverage of the mat along the axial length of the drum without overconcentrating the spray at any given point to avoid tearing the mat.

The desired spray pattern and trajectory of the spray from each spray hole to the drum surface is achieved by providing each row of such holes with its own adjacent spray diffusion flange means. Row 26 has the upper flange means 32 and row 28 has the lower flange means 34. "Upper" and "lower" in this case refer to the relative positions of the two flange means with respect to each other and to the drum surface. Upper flange means 32 comprises a separate, individual fanshaped diffusion flange 36 for each spray hole 30, each threadedly connected to the pipe body in the manner disclosed in copending application Ser. No. 709,405. However, lower flange means 34 comprises a single continuous flange 38 extending axially along all of the spray holes 30 in row 28. The construction, shape and method of attachment of continuous lower flange 38 is by bonding as described in the aforementioned U.S. Pat. No. 4,522,716. The upper concavely curved spray-receiving surfaces of the continuous flange 38 and separate upper flanges 36 may be directed at angles from the pipe toward the drum surface such that the trajectories or spray planes 40, 42 of the sprays leaving such flanges never merge before impinging the mat on the drum surface to prevent overconcentration of spray impinging the mat. Alternatively, the upper and lower flanges may be angled and positioned such that their respective trajectories 40, 42 merge before impinging the mat on a lower flange extension 44, shown best in FIG. 2.

Lower flange extension 44 is a thin, flexible sheet which extends toward the drum surface from the outer end of the lower flange 38, terminating at a free outer end 46 closely adjacent to or in light contact with the mat on drum surface 16. Extension 44 extends laterally continuously throughout substantially the full axial length of lower flange 38, terminating at its opposite end edges in an upright wall or dam 48 which confines the liquid leaving the lower flange within the lateral limits of the extension. The height of dam 48 can vary depending on the flow rate of liquid emitted from the lower row of spray holes. If the two spray trajectories 40, 42 merge on the lower flange extension 44 before impinging the mat, the impact force of the sprays is effectively dissipated before they impinge the mat, thereby avoiding tearing of the mat.

Extension 44 includes an upper portion 50 which extends beneath flange 38 and is clamped to its lower surface by a backing plate 52 joined to the lower flange by attaching means such as threaded fasteners (not shown).

A primary purpose of flange extension 44 is to reduce heat loss from the washing liquid during its travel from the shower pipe to the mat on the drum surface. The spray is at high temperature as it leaves the shower pipe, but the heat loss from the spray is substantial thereafter because of its exposure to the air. Heat loss is inhibited somewhat in the area of the upper and lower flanges because of the heat-confining effect of such flanges. Nevertheless, such flanges normally terminate several inches short of the drum surface, exposing the sprays leaving such flanges to rapid heat loss in this distance. The lower flange extension 44 in effect prevents any substantial heat loss from the spray planes 40, 42 in a downward direction. Moreover, the upper spray plane 40 effectively prevents any substantial heat loss from the lower spray plane 42 in an upward direction. Therefore, with the use of lower flange extension 44, the only substantial heat loss that can occur is upward from the upper spray plane 40. Accordingly, heat loss is substantially reduced and energy efficiency promoted through the use of the extension 44.

Extension 44 is sufficiently flexible that its outer tip 46 will easily ride over any mat surface irregularities caused by variations in mat thickness. A suitable material for the extension has been found to be a flexible plastic manufactured under the trade name KYNAR although no doubt there are many other suitable plastic materials that would suffice for this purpose.

Although the lower flange extension is shown applied to a continuous lower flange, it is to be understood that such extension could also be applied to lower flange means comprising a separate lower flange for each spray hole in lower row 28, similar to the separate upper flanges 36. In such case, the lower backing plate 52 could be either continuous throughout the effective spraying length of the pipe body 18, or separate backing plates could be applied to each separate diffusion flange.

The flange extension 44 would also be applicable to shower pipes having a single row of spray holes and a single associated flange means to reduce substantially the heat loss from the spray plane produced by such flange means. For example, the flange extension could be effectively applied to the lowermost positioned diffusion flanges of the shower pipe shown in FIG. 4 having a single row of spray holes.

Another advantage of the use of the flange extension 44 and its associated backing plate 52 is that the resulting assembly effectively reinforces lower flange 38 by increasing its effective thickness, thereby increasing its resistance to deflection and breakage. Such deflection and breakage can sometimes otherwise occur when an unusually thick slug or "roll-up" of pulp stock moving upwardly on the mat along the drum surface wedges itself against a diffusion flange. If such a slug or roll-up should be forced against reinforced lower flange 38, as for example, where pipe 10 is the lowermost pipe in a bank of such pipes arranged along the upwardly rotating surface of the filter drum, the reinforced lower flange 38 would act as a striker to level the mat and limit its thickness passing upwardly beyond the lower flange, thereby protecting the other diffusion flanges positioned above it in the bank from breakage.

Figure 3:
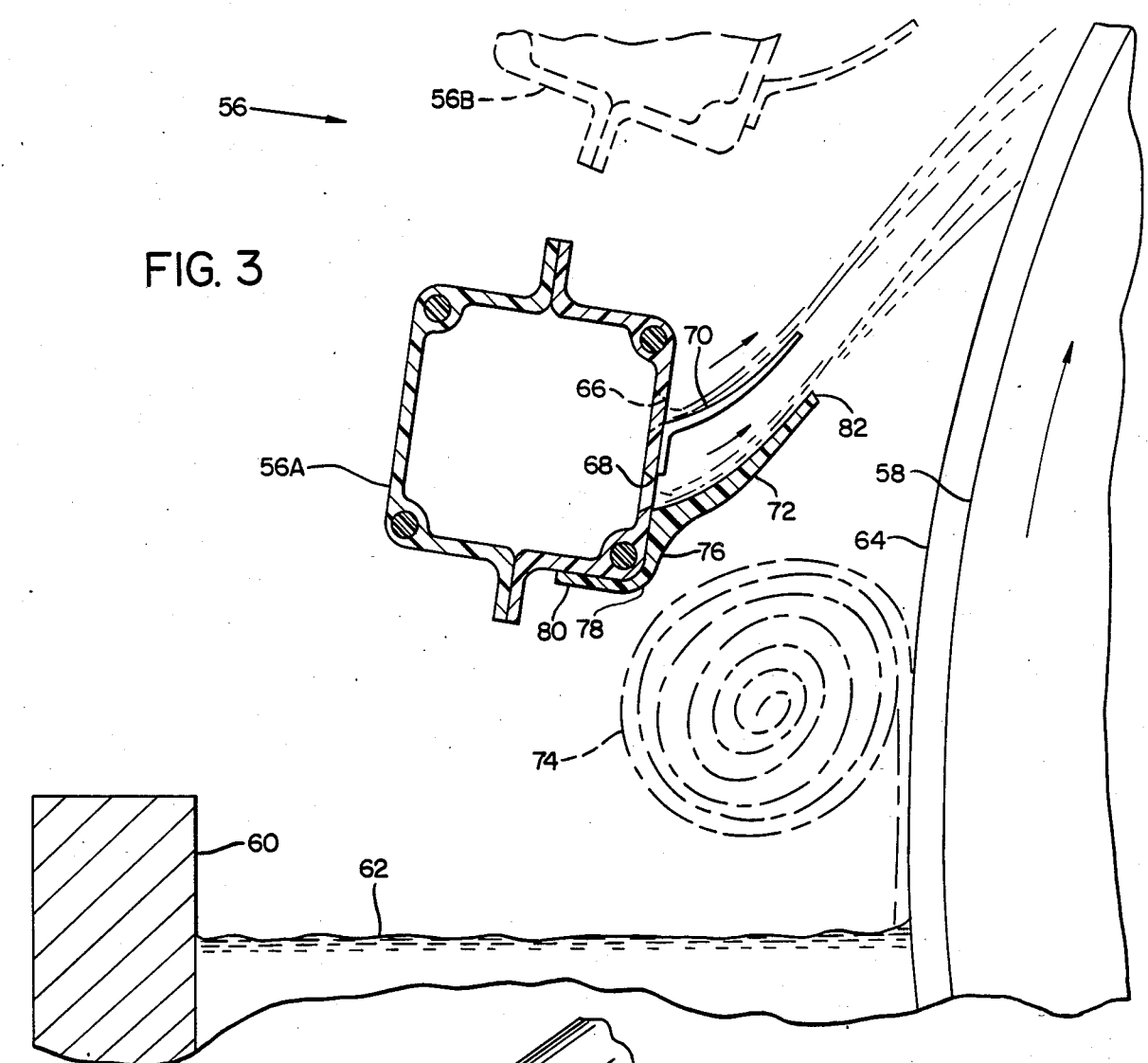
FIG. 3 is an elevational view of an emerging portion of a rotary drum filter and associated portion of a vat of pulp slurry and part of an associated bank of shower pipes including a lowermost shower pipe in accordance with a first modified form of the invention.

Embodiment of FIG. 3

The foregoing concept of the lowermost flange means of the lowermost pipe in a bank of shower pipes serving as a striker to limit the thickness of pulp stock on the drum surface, has been refined in the shower pipe embodiment shown in FIG. 3. Referring to FIG. 3, a bank 56 of several shower pipes, typically about six, is arranged along the upwardly rotating surface 58 of a filter drum where the drum surface emerges from a vat 60 of pulp slurry 62 carrying a mat 64 of pulp stock. Only the lowermost two pipes 56A, 56B of the bank are shown.

In general, the shower pipes 56 in the bank are similar in construction to the shower pipe 10 of FIGS. 1 and 2. They are of rectangular cross section and of fiberglass construction. Each includes two parallel rows of staggered spray holes including an upper row 66 and a lower row 68, having respective upper flange means 70 and lower flange means 72. In fact, except for the lowermost shower pipe 56A in the bank, shower pipes 56 may be identical to those shown in FIGS. 1 and 2, those disclosed in prior co-pending application Ser. No. 709,450, or those shown in U.S. Pat. No. 4,522,716.

However, lowermost shower pipe 56A in the bank has a modified lower diffusion flange means 72 to provide a most effective striker means for reducing excessive stock thickness or roll-up 74 of the pulp mat 64 and preventing such roll-up from traveling upwardly on the drum surface beyond such lower flange. For this purpose, lower flange means 72 is an axially continuous flange having a connection 76 at its base to the pipe body which is reinforced to prevent breakage of the flange at such connection when roll-up 74 wedges against its undersurface.

The reinforced connection 76 comprises an extra layer of FRP material extending from the quadrant of pipe 56A from which the diffusion flanges project, wrapping around the corner 78 of the pipe, and terminating at 80 on the adjacent quadrant. In addition, lower flange 72 itself is reinforced to resist upward deflection when engaged by a roll-up by being of substantially greater thickness than the thicknesses of the other diffusion flanges 70. Furthermore, lower flange 72 is of greater length than its adjacent upper flange 70 and the other flanges in the bank in a direction toward the drum surface. Therefore, the outer end 82 of lower flange 72 is positioned substantially closer to the surface of mat 64 than the other flanges in the bank. As a result, any stock passing the tip 82 of the lower flange 72 will clear all of the other flanges in the bank, thereby preventing any damage or breakage of such other flanges, and at the same time leveling the mat to an acceptable thickness.

If desired, the lower flanges of all of the pipes 56 in the bank, including the lower flange 72 of the lowermost pipe 56A may be provided with the flange extension 44 as shown in FIGS. 1 and 2 for heat conservation. Such extension should not interfere with the striker function of lower flange 72 because the extension has sufficient flexibility to ride over any excess mat thickness, including roll-up. Yet lower flange 72 has sufficient strength and rigidity to continue to serve its striker function despite the flexing of the extension.

Figure 4:
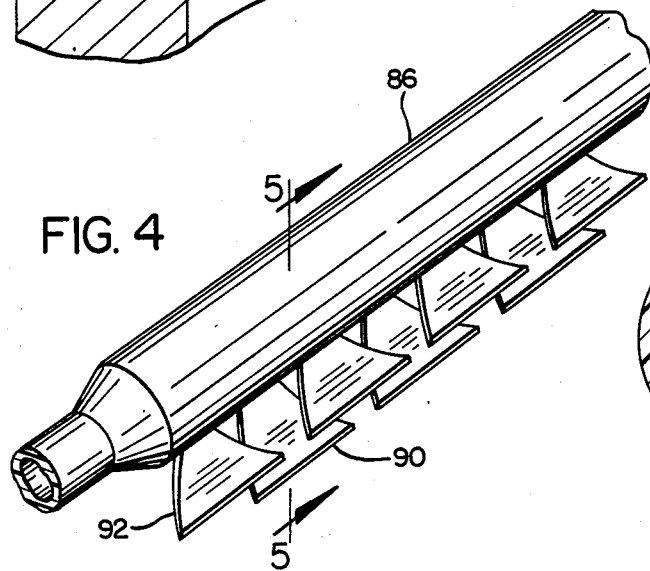
FIG. 4 is a perspective view similar to FIG. 1 showing a shower pipe in accordance with a second modified form of the invention.
Figure 5:
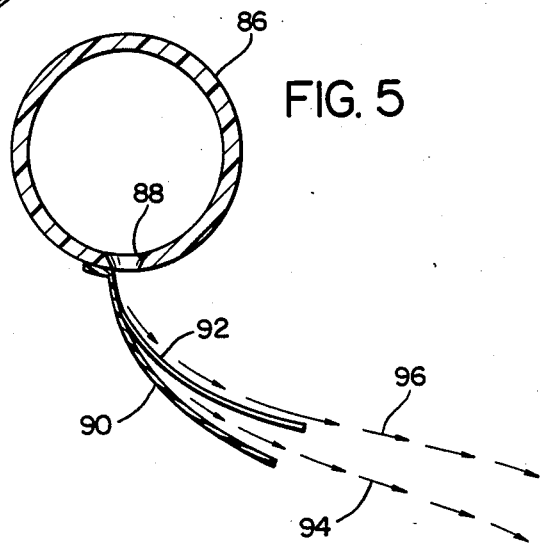
FIG. 5 is a cross sectional view taken along the line 5-5 of FIG. 4.

Embodiment of FIGS. 4-5

Referring to FIGS. 4 and 5, a shower pipe 86 of circular cross section is made of stainless steel. It includes a single row of axially aligned spray holes 88. The spray holes are provided with separate, individual diffusion flanges 90, 92. The spray holes are spaced and the flanges designed such that the sprays emitted from adjacent spray holes spread laterally sufficiently that adjacent sprays overlap at least slightly axially of the pipe before such sprays impinge a mat on the drum surface.

To prevent the sprays from adjacent spray holes from actually merging to any substantial extent before impinging the mat, adjacent diffusion flanges 90, 92 project from the pipe at different angles to define different spray planes or trajectories 94, 96, respectively. Spray trajectory 94 impinges the mat surface 98 at a different circumferential location than does adjacent spray trajectory 96 so that such sprays do not merge despite their axial overlap. For simplicity of manufacture, every other diffusion flange 90, 92 along the line of spray holes 88 projects from the pipe at the same angle to define the same spray plane or trajectory 94, 96. Each flange is preferably attached to the pipe using a threaded connection 100 as disclosed in detail in co-pending application Ser. No. 709,450. Thus, only two different types of diffusion flanges need be provided, one, 90, defining trajectory 94, and the other, 92, defining trajectory 96, both of which are easily attached to the pipe using identical threaded connectors 100.

Having illustrated and described the principles of our invention by what are now several preferred embodiments, it should be apparent to persons skilled in the art that such embodiments may be modified in arrangement and detail without departing from such principles. We claim as our invention the preferred embodiments and all such modifications and equivalents thereof as come within the true spirit and scope of the following claims.

I claim:

1. A shower pipe for a rotary drum filter comprising:
    a length of pipe for spanning the length of a filter drum;
    means defining a plurality of spray holes extending through said pipe, said holes being spaced apart along the length of the pipe;
    means defining a spray diffusion flange projecting from the pipe adjacent a lower edge of each spray hole for dispersing spary of washing liquid emitted under pressure from the pipe through the spray hole generally in a plane toward the surface of the filter drum, said flange adapted to terminate at an outer end spaced from the drum surface;
    means defining a diffusion flange extension extending from an outer end of the diffusion flange associated with at least some of said spray holes in a direction generally toward the filter drum surface and terminating at a free outer end adjacent the drum surface.

2. A shower pipe according to claim 1 wherein said spray holes are arranged axially of said pipe in at least two parallel rows of said holes, each row including separate diffusion flange means, one of said rows being positioned lower than the other of said rows relative to an associated filter drum surface whereby the diffusion flange means for the lower row is positioned lower than the diffusion flange means including said flange extension.

3. A shower pipe according to claim 2 wherein only said lower flange means includes said flange extension.

4. A shower pipe according to claim 3 wherein said rows of holes are spaced circumferentially of said pipe from one another and said rows are oriented relative to an associated drum surface and said flange means project from the pipe, such that the sprays diffused from the upper flange means merge with the sprays diffused from the ower flange means on the lower flange extension.

5. A shower pipe according to claim 2 wherein said upper flange means includes a separate diffusion flange for each spray hole in said upper row and said lower diffusion flange means comprises a single continuous diffusion flange extending lengthwise of the pipe along said lower row of spray holes, said flange extension being axially continuous and substantially coextensive with said lower flange.

6. A shower pipe according to claim 2 wherein said lower flange means has a greater effective thickness than said other flange means for greater resistance to deflection upon engagement with pulp mat stock on an associated drum surface and to provide striker means to control the thickness of the mat on the drum surface passing by said lower flange means.

7. A shower pipe according to claim 1 wherein the diffusion flange associated with said flange extension is reinforced to have a high resistance to deflection and is positioned and dimensioned relative to an associated filter drum surface so as to provide a striker means for limiting the thickness of pulp mat stock on the drum surface passing by said flange.

8. A shower pipe according to claim 7 wherein said reinforced diffusion flange has a greater effective thickness dimension than other diffusion flange means positioned above said reinforced flange along the drum surface.

9. A shower pipe according to claim 1 in which said flange extension is sufficiently flexible such that the extension rides over any surface irregularities in a pulp mat on the drum surface.

10. A shower pipe according to claim 1 wherein said diffusion flange is rigid and terminates at an outer end spaced a substantial distance from the drum surface and said flange extension is flexible with its said free end terminating in juxtaposed relationship to the drum surface.

11. A shower pipe according to claim 1 wherein said flange extension extends continuously throughout substantially the full effective spraying length of said shower pipe.

12. A shower pipe according to claim 1 wherein said flange extension includes dam means extending upwardly from the laterally opposite side edges of said extension to confine spray liquid dispersed onto said extension laterally within the confines of said extension.

13. A shower pipe according to claim 1 wherein both said diffusion flange and said flange extension are continuous throughout substantially the full effective spraying length of the shower pipe.

14. A shower pipe according to claim 1 wherein said extension is flexible so that it rides over surface variations in a mat of pulp stock on a drum surface when engaging the mat;
said diffusion flange being rigid;
said flange and associated extension being continuous throughout substantially the full effective spraying length of the pipe,
said extension including dam means extending upwardly from opposite side edges thereof to confine liquid dispersed onto said extension laterally within the confines thereof.

15. A shower pipe for a rotary drum filter comprising:
a length of pipe for spanning the length of a filter drum;
means defining first and second parallel rows of spray holes extending through said pipe along the length thereof,
each said row including an associated diffusion flange means extending adjacent each spray hole of the row for diffusing liquid emitted under pressure from said pipe through said spray holes laterally therefrom and generally in a plane projected toward the surface of an associated filter drum, said rows and flange means including an upper row and a lower row and associated upper flange means and lower flange means relative to their intended orientation with respect to an associated filter drum surface,
said shower pipe being adapted for mounting adjacent to an upwardly moving portion of a filter drum surface;
said lower flange means having a greater resistance to upward deflection than said upper flange means so as to provide striker means for limiting the thickness dimension of a mat of pulp stock on an associated drum surface moving upwardly past said shower pipe.

16. A shower pipe according to claim 15 including means connecting said upper and lower flange means to said shower pipe, said connecting means for said lower flange means including means reinforcing the connection of said lower flange means to the pipe for resisting bending stresses at said connection upon engagement of said lower flange means with pulp stock on the associated drum surface.

17. A shower pipe according to claim 16 wherein said pipe is generally rectangular in cross section with said upper and lower flange means both extending from the same quadrant of said pipe, the reinforced connection for said lower flange means including a thickened base at the intersection of said lower flange means and said pipe extending from said quadrant around a corner of said pipe onto an adjacent quadrant of said pipe.

18. A shower pipe according to claim 15 wherein said upper flange mens includes a separate diffusion flange for each spray hole in said upper row and said lower flange means comprises a diffusion flange that extends continuously along said lower row.

19. A shower pipe according to claim 18 wherein said separate diffusion flanges are threadedly connected to said pipe and are of lesser projecting length than said lower flange means.

20. A shower pipe according to claim 15 wherein said lower flange means has a greater thickness dimension than said upper flange means to provide said greater resistance to deflection.

21. A shower pipe according to claim 15 wherein said lower flange means projects a greater distance from said pipe than said upper flange means.

22. A shower pipe according to claim 15 wherein said lower flange means has an outer end positioned closer to the surface of the filter drum than the outer end of said upper flange means.

23. A shower pipe for a rotary drum filter comprising:
a length of pipe for spanning the length of a filter drum;
means defining a plurality of spray holes extending through said pipe, said holes being spaced apart along the length of the pipe;
means defining a spray diffusion flange projecting from the pipe adjacent a lower edge of each spray of washing liquid emitted under pressure from the pipe through the spray hole generally in plane toward the surface of the filter drum, said flange adapted to terminate at an outer end spaced from the drum surface;
means defining a diffusion flange extension extending from an outer end of the diffusion flange associated with at least some of said holes in a direction generally toward the filter drum surface and terminating at the free outer end adjacent the drum surface, and flange extension being removably connected to its associated diffusion flange.

24. In a rotary drum filter assembly including a filter drum rotatable through a vat of pulp slurry and multiple shower pipes arranged in parallel relationship axially of said drum and in a generally vertically extending bank along an upwardly rotating surface portion of the drum emerging from the vat
each of said shower pipes including a row of spray holes extending along the length of the pipe and an associated diffusion flange means adjacent each spray hole for diffusing spray emitted under pressure from the hole laterally of the hole and generally in a spray plane toward the drum surface;

the lowermost said pipe in said bank having flange means of greater resistance to deflection than said flange means of the other pipes in said bank to provide striker means for limiting the maximum thickness dimension of a mat of pulp stock passing by said lowermost pipe on the upwardly rotating drum surface emerging from the vat.

25. A shower pipe according to claim 24 wherein said lowermost pipe includes two rows of said spray holes including an upper row and a lower row, each said row including a separate respective upper and lower flange means, said lower flange means having a greater resistance to deflection than said upper flange means.

26. A shower pipe according to claim 24 wherein said flange means of said lowermost pipe has a greater thickness dimension than the flange means of said other pipes to provide said greater resistance to deflection.

27. A shower pipe according to claim 24 wherein said flange means of said lowermost pipe extends closer to the surface of said drum than said other flange means.

28. A shower pipe according to claim 25 wherein said lower flange means is longer than said upper flange means in a direction toward the drum such that the outer end of said lower flange means is positioned closer to the drum surface than the outer end of said upper flange means.

29. A method of preventing roll-up or excessive stock thickness of a pulp stock mat on the surface of a rotary drum filter to protect a bank of shower pipes arranged along the upwardly rotating surface of the drum from damage, said method comprising:

reinforcing the lowermost spray diffusion flange on the lowermost shower pipe in the bank and reinforcing the connection of said flange with said lowermost pipe so as to resist deflection when engaged by pulp stock on the drum, and positioning the outer end of said flange closer to the drum surface than the other flanges in said bank, so that said reinforced flange provides a striker blade for limiting the thickness of the mat of pulp stock on the drum surface that can pass by said lowermost flange.

30. A shower pipe for a rotary drum filter comprising:

a length of pipe for spanning the length of a filter drum;

means defining a row of spray holes extending through said pipe along the length thereof;

a separate diffusion flange projecting from said pipe adjacent each said spray hole for diffusing liquid under pressure emitted from said pipe through the associated hole laterally of said hole and generally in a spray plane toward an associated filter drum surface;

each said flange being operative to diffuse the liquid emitted from its associated spray hole axially of the pipe to an extent such that axially adjacent sprays overlap axially before impinging the surface of an associated drum, whereby the full axial length of the drum surface is sprayed;

each flange along said row extending from said pipe at a different angle from the next adjacent flange such that adjacent flanges project their respective sprays toward the drum surface in different trajectories whereby there is no substantial merging of the sprays from adjacent flanges before said sprays impinge the associated drum surface so as to prevent overconcentration of spray at any point on the surface.

31. A shower pipe according to claim 30 wherein every other diffusion flange in a direction axially of the shower pipe extends at the same angle from said pipe to project their respective sprays in substantially the same trajectory toward said associated drum surface.

32. A shower pipe according to claim 30 wherein said spray holes are arranged in a single axial row along said pipe.

33. A shower pipe according to claim 30 wherein said diffusion flanges include threaded connections of said flanges to said pipe.

* * * * *

UNITED STATES PATENT AND TRADEMARK OFFICE
CERTIFICATE OF CORRECTION

PATENT NO. : 4,697,292
DATED : October 6, 1987
INVENTOR(S) : RICHARD W. LAVALLEY It is certified that error appears in the above-identified patent and that said Letters Patent is hereby corrected as shown below:

Column 1, line 7, after "U.S. Pat. No. 4,670,099" insert

--issued 06-02-87--;

Column 4, line 24, before "DESCRIPTION" insert --DETAILED--;

Column 4, line 37, before "body" insert --pipe--;

Column 4, line 39, after "herein" insert --by--;

Column 8, line 39, after "flange means" insert

--for the other row, said lower diffusion flange means--;

Column 8, line 49, "ower" should be --lower--;

Column 10, line 21 "mens" should be --means--.

Signed and Sealed this

Thirteenth Day of December, 1988

*Attest:*

DONALD J. QUIGG

*Attesting Officer*  *Commissioner of Patents and Trademarks*